Oct. 26, 1926.
H. S. BOLTON
BARGE
Filed April 30, 1925
1,604,676
3 Sheets-Sheet 1
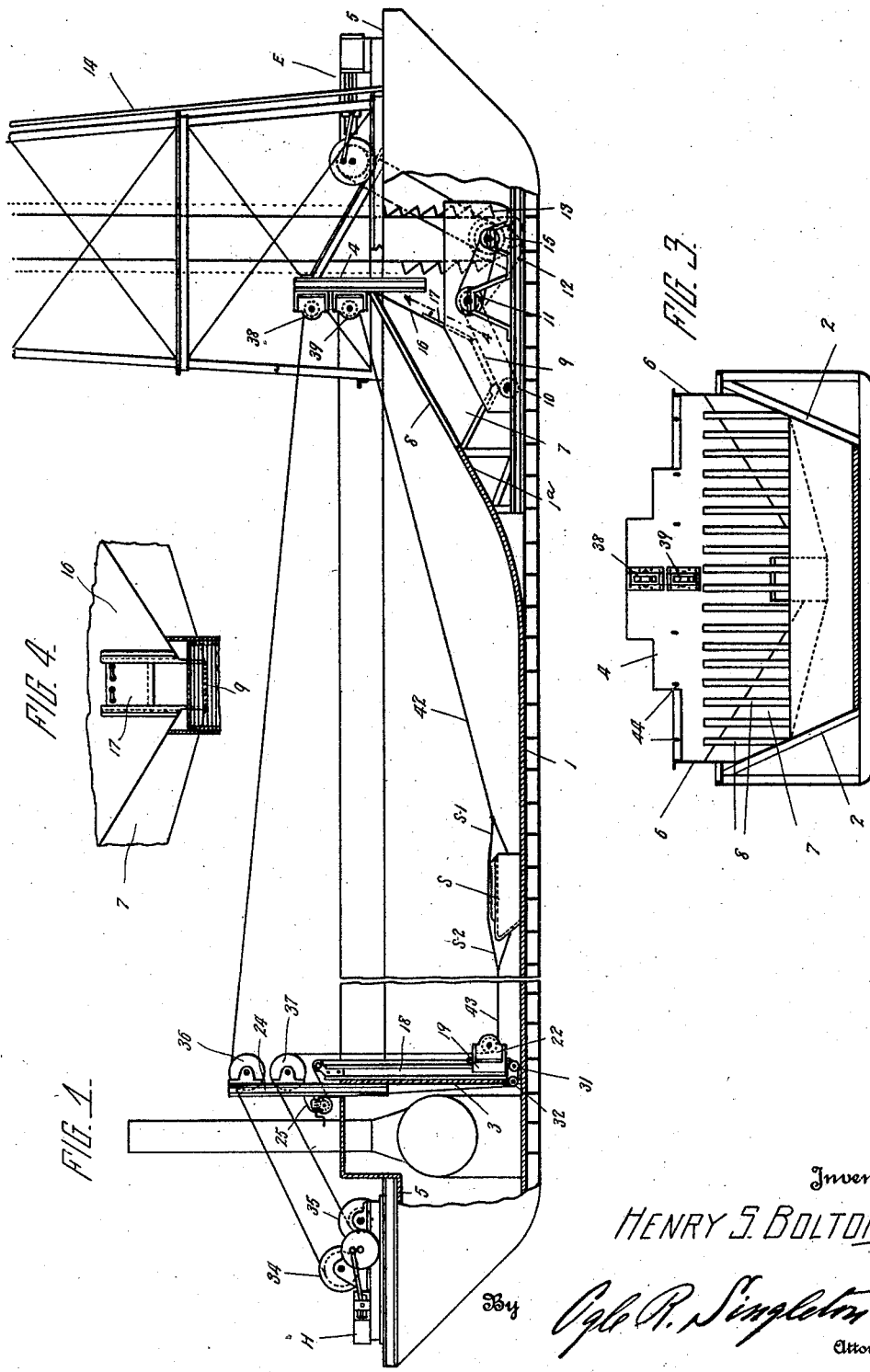
Inventor:
HENRY S. BOLTON
By Ogle R. Singleton
Attorney

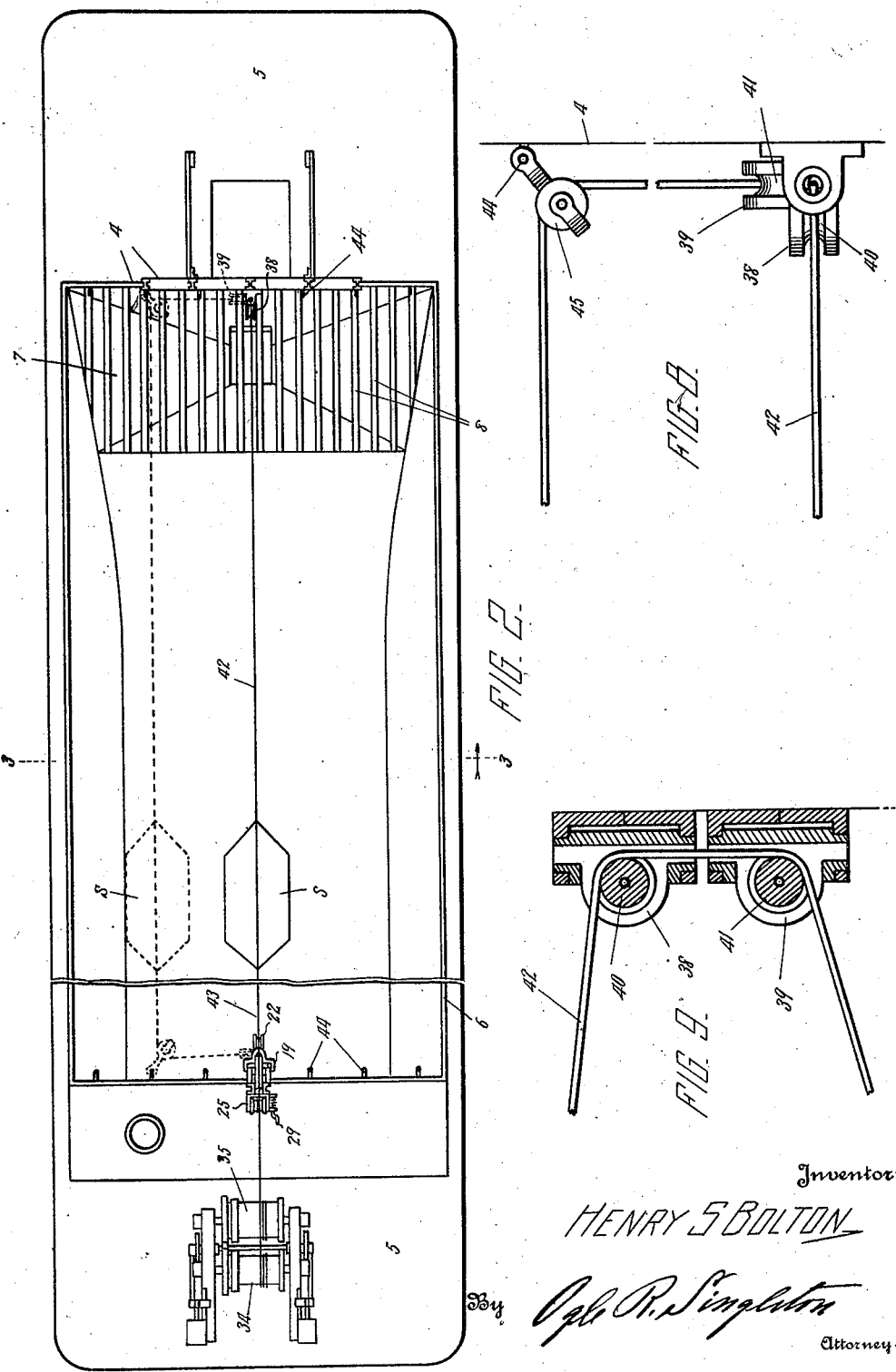

Oct. 26, 1926.
H. S. BOLTON
1,604,676
BARGE
Filed April 30, 1925  3 Sheets-Sheet 3
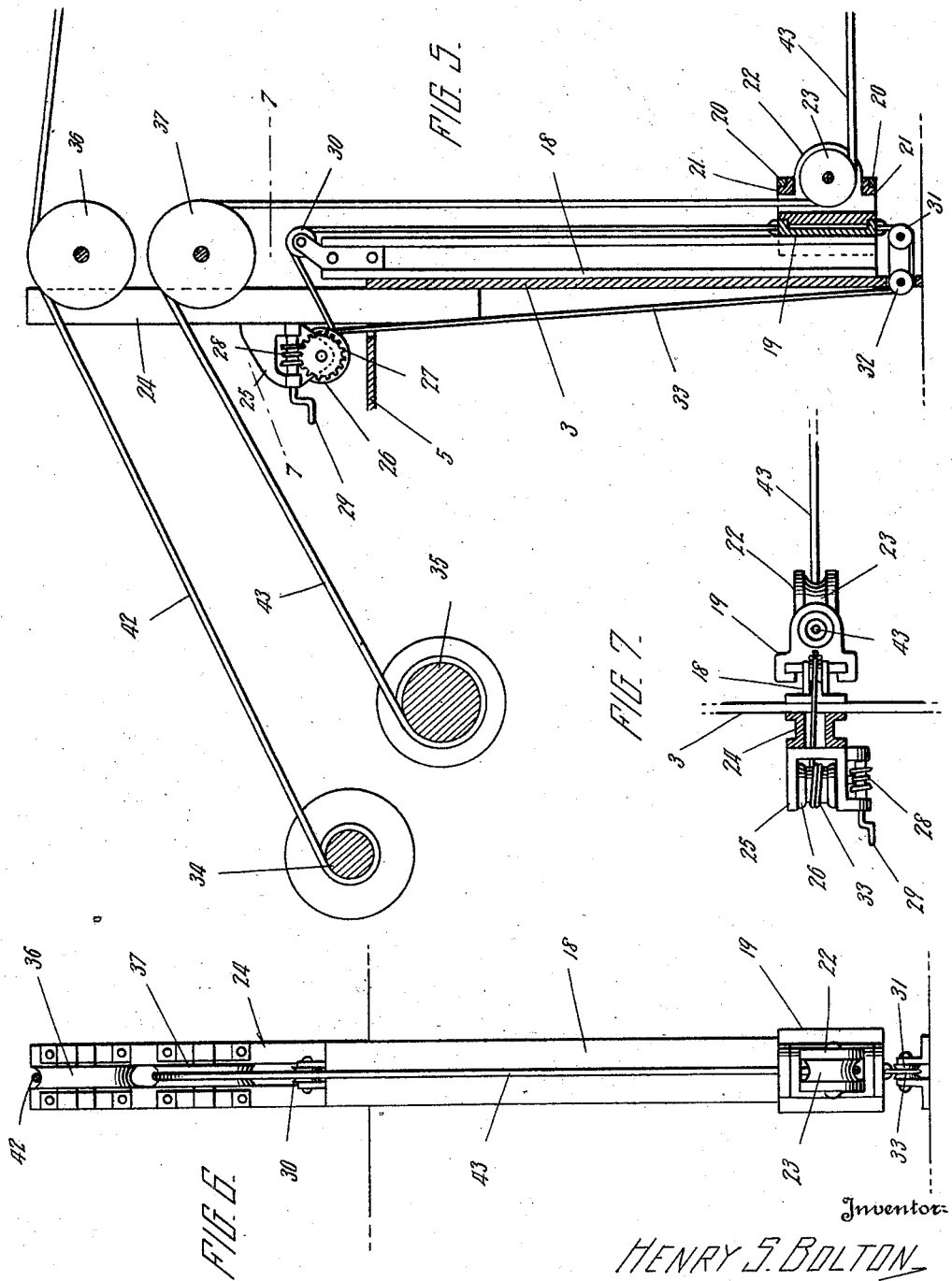

Patented Oct. 26, 1926.

1,604,676

UNITED STATES PATENT OFFICE.

HENRY S. BOLTON, OF SPARTANBURG, SOUTH CAROLINA.

BARGE.

Application filed April 30, 1925. Serial No. 26,946.

My invention consists in a new and useful improvement in barges and is designed to provide a barge equipped with means for discharging a cargo of granular material, such as coal, sand, gravel or ore from the hold of the barge to a ship or dock. The means which I provide comprise a drag scraper which is adapted to operate in all portions of the cargo hold of the barge, a discharge hopper into which the scraper delivers the material, an endless belt conveyor which removes the material from the bottom of the hopper, a second discharge hopper into which the conveyor delivers the material, and an endless bucket conveyor operating in the second hopper to hoist the material from the hold. The operation of the discharge means secures the efficient unloading of the cargo from the hold to the storage point without exposing the cargo during its discharge, thus eliminating dust, which is a most desirable feature especially in the case of coal handling on passenger vessels. The particularly novel feature of my invention is the combination of the drag scraper with its operating mechanism, the discharge hopper therefor, the belt conveyor, the discharge hopper therefor, and the bucket conveyor operating in the second hopper. A very valuable feature of my device is the control gate related to the belt conveyor by which the amount of material handled by the conveyor may be regulated. Another valuable feature of my device is the means I provide for synchronizing the operation of the belt conveyor and the bucket conveyor, by which I eliminate choking of the second discharge hopper and clogging of the bucket conveyor. The structure of the barge, hold, deck, etc., may be of the ordinary design, and all masts, booms, derricks and other auxiliary hoisting gear are eliminated on my improved barge.

The mechanism is of such simplicity of operation that it can be handled by two operators, one controlling the drag scraper, and the other the bucket conveyor, thus materially decreasing the labor cost in the unloading process.

The novelty and utilitarian advantage of my improved barge over similar apparatus now in use consists in the efficient combination of the various elements by which the cargo discharge is accomplished.

In the accompanying drawings, I have illustrated one specific embodiment of my invention, but it is to be distinctly understood that I do not consider my invention limited to the details of construction illustrated in said embodiment, but refer for its scope to the claims appended hereto.

In the drawings:

Fig. 1 is a longitudinal vertical section of a barge equipped with my device.

Fig. 2 is a top plan view of the barge.

Fig. 3 is a transverse section on the line 3—3 of Fig. 2.

Fig. 4 is an elevation of a detail on the line 4—4 of Fig. 1.

Fig. 5 is an enlarged side elevation of a detail of the drag scraper operating mechanism.

Fig. 6 is an enlarged end elevation of the detail shown in Fig. 5.

Fig. 7 is a section on the line 7—7 of Fig. 5.

Fig. 8 is an enlarged top plan view of another detail of the drag scraper operating mechanism.

Fig. 9 is an enlarged vertical section of a portion of the detail shown in Fig. 8.

My invention, embodied in the details of construction illustrated in the drawings, comprises a barge provided with an inner bottom 1, sloping inner sides 2, an after bulkhead 3 and a forward bulkhead 4, a deck 5 and a hatch combing 6. Just abaft the forward bulkhead 4, the barge is provided with a discharge hopper 7, toward which the bottom 1 slopes upwardly, as indicated at 1ª. Breaker bars 8 are provided across the open top of the hopper 7. Directly below the discharge opening in the bottom of the hopper 7, I provide an endless belt conveyor 9 suitably mounted on rollers 10 and 11 mounted in the bottom of the barge. At the discharge end of the conveyor 9, I provide a hopper 12, through which passes the endless bucket conveyor 13 carried aloft by the tower 14 upon the deck 5 of the barge. The conveyor 13 is driven by the engine E operating the driving gear 15 which drives the roller 11 of the belt conveyor 9 so that the operation of the conveyor 9 and the operation of the conveyor 13 are synchronized.

Upon the rear wall 16 of the hopper 7, I provide a gate 17 slidably mounted relative to the belt conveyor 9 by which the depth of material handled by the conveyor 9 may be regulated.

I will now describe the means I provide for delivering the material in the barge to the hopper 7.

Suitably fastened to the forward side of the after bulkhead 3, on the keel line of the barge, there is the vertically disposed I-beam 18 which has slidably mounted thereon the bracket 19 having journals 20 in which are mounted the hollow trunnions 21 of the fairlead 22 carrying the sheave 23. Suitably fastened to the after side of the after bulkhead 3 is the yoke 24 carrying the bracket 25 in which is mounted the cable drum 26 provided with a worm gear 27 driven by a worm 28 journaled in the bracket 25 and provided with an operating crank 29. The I-beam 18 is provided at its top with the sheave 30, and below the I-beam 18, suitably journaled in the bottom of the barge are the two sheaves 31 and 32. A cable 33 has several turns about the drum 26, is rove through sheaves 30, 31 and 32 and has its ends attached to the bracket 19. It will be obvious that the foregoing details of construction provide means for the vertical adjustment of the sheave 23.

On the after part of the deck 5, I provide a hoist engine H provided with two drums 34 and 35 for the inhaul and return respectively, which are suitably provided with any ordinary type of clutches and brakes to facilitate their proper operation. In the yoke 24, there are mounted two guide sheaves 36 and 37. Suitably mounted on the forward bulkhead 4 are two fairleads 38 and 39 carrying respectively the sheaves 40 and 41. The drag scraper S has the load line 42 attached to its front bridle S¹, rove through the sheaves 40 and 41 at the forward end of the barge, and sheave 36 at the after end of the barge, and wound on drum 34. The return line 43 leads from the rear bridle S² of the scraper S, is rove through the sheave 23, hollow trunnion 21, and guide sheave 37, and wound upon the drum 35. It is to be noted that the drum 35 is of a diameter twice that of the drum 34, thus securing the quick return of the empty scraper S and reducing the time of the discharge of the cargo. The operation of the scraper S is controlled by a single operator upon the after part of the deck 5.

Hooks 44 are provided in the bulkheads 3 and 4, and snatch blocks 45, through which the lines 42 and 43 are rove, may be attached to hooks 44, so as to cause the scraper S to travel in paths parallel with and on either side of the keel line of the barge. When the blocks 45 are used, it is to be noted that the fairleads 22 and 39, turning through arcs of 90°, will cause the lines 42 and 43 to lead properly.

Having described my invention, what I claim is:

1. In a barge, the combination of a drag scraper adapted to travel horizontally through the hold of the barge and be adjusted horizontally and vertically; a discharge hopper having a distended receiving opening, for receiving material from said scraper, and a constricted discharge opening; an endless belt conveyor so disposed as to receive material from the constricted discharge opening of said hopper; a second hopper so disposed as to receive material discharged by said conveyor; and an endless bucket elevator having its lower end so disposed that its buckets pass through said second hopper.

2. In a barge, the combination of a drag scraper; a load line attached to said scraper; a return line attached to said scraper; two independently movable fairleads, each provided with a sheave through which the load line is rove; an adjustable fairlead provided with a sheave through which the return line is rove; means for adjusting said adjustable fairlead; and means for operating said load line and said return line.

3. In a barge, the combination of a drag scraper; a load line attached to said scraper; a return line attached to said scraper; two independently movable fairleads, each provided with a sheave through which the load line is rove; an adjustable snatch block through which said load line is rove; an adjustable fairlead provided with a sheave through which the return line is rove; an adjustable snatch block through which the return line is rove; and means for operating said load line and said return line.

In testimony whereof I affix my signature.

HENRY S. BOLTON.